United States Patent
Miyano et al.

(10) Patent No.: US 6,820,000 B2
(45) Date of Patent: Nov. 16, 2004

(54) ELECTRONIC CONTROL DEVICE HAVING CONTROL AND MONITORING CPUS

(75) Inventors: Hidemasa Miyano, Obu (JP); Takahiro Joko, Toyota (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/261,629

(22) Filed: Oct. 2, 2002

(65) Prior Publication Data

US 2003/0083802 A1 May 1, 2003

(30) Foreign Application Priority Data

Oct. 31, 2001 (JP) ........................................ 2001-334364

(51) Int. Cl.[7] .......................... F02D 31/00; G06F 19/00
(52) U.S. Cl. ........................ 701/114; 701/102; 701/115; 714/23
(58) Field of Search ................................ 701/114, 115, 701/110, 102; 714/23

(56) References Cited

U.S. PATENT DOCUMENTS

| | | | | |
|---|---|---|---|---|
| 4,760,275 A | * | 7/1988 | Sato et al. ................ | 307/10.1 |
| 4,791,569 A | * | 12/1988 | Suzuki ..................... | 701/102 |
| 4,881,227 A | | 11/1989 | Buhren .................... | 714/11 |
| 5,095,438 A | * | 3/1992 | Sasaki ..................... | 701/114 |
| 5,390,103 A | | 2/1995 | Sakakibara ............... | 709/400 |
| 5,526,267 A | | 6/1996 | Sogawa .................... | 701/114 |
| 5,987,365 A | | 11/1999 | Okamoto .................. | 701/29 |
| 2001/0027537 A1 | * | 10/2001 | Nada et al. ............... | 714/23 |
| 2003/0060964 A1 | * | 3/2003 | Ozeki et al. .............. | 701/114 |

FOREIGN PATENT DOCUMENTS

| | | | |
|---|---|---|---|
| EP | 1 143 314 A1 | 10/2001 | |
| JP | A-2-42560 | 2/1990 | |
| JP | A-2-115967 | 4/1990 | |
| JP | A-7-152608 | 6/1995 | |
| JP | 10-150703 | * 6/1998 | ........... B06L/11/12 |
| JP | A-2000-303900 | 10/2000 | |

* cited by examiner

Primary Examiner—Hieu T. Vo
(74) Attorney, Agent, or Firm—Nixon & Vanderhye PC

(57) ABSTRACT

The engine ECU includes a control CPU and a monitoring CPU. The control CPU has a vehicular engine control function and an electronic throttle control function. The monitoring CPU is connected to the control CPU in an intercommunicative manner. The monitoring CPU communicates with the control CPU to receive data at least on the throttle control from the control CPU. The monitoring CPU determines whether the data from the control CPU is properly received. If the date is not properly received, the monitoring CPU resets the control CPU.

18 Claims, 10 Drawing Sheets

ELECTRONIC CONTROL DEVICE HAVING CONTROL AND MONITORING CPUS

CROSS REFERENCE TO RELATED APPLICATION

This application is based on and incorporates herein by reference Japanese Patent Application No. 2001-334364 filed on Oct. 31, 2001.

FIELD OF THE INVENTION

The present invention relates to an electronic control device having a control CPU and a monitoring CPU.

BACKGROUND OF THE INVENTION

Because of high performance and the increased capacity of CPUs in resent years, it is possible to have various controls performed by a single control CPU. These events have led to decreases in the cost of control devices, such as engine ECUs. In such a control device having a single CPU configuration, a monitoring CPU is required for monitoring the controls. However, a stripped-down (inexpensive) CPU can satisfy the requirement for the monitoring CPU because the monitoring CPU is used exclusively for a monitoring purpose. Other controls are performed by the control CPU.

In the control device, a watchdog (WD) circuit can be used for monitoring operations of the control CPU. If a data transmission error occurs and the control CPU is reset by the WD circuit, fail-safe operations may not start immediately after the occurrence of the error.

When the error occurs, the monitoring CPU stops data transmission to the control CPU. Because the control CPU has no input from the monitoring CPU, it resets the monitoring CPU. If the data transmission error continues after resetting the monitoring CPU for several times, the control CPU stops outputting the WD pulse. Because the WD circuit has no input from the control CPU, it resets the control CPU. With this configuration, the fail-safe operations do not start at the time when the monitoring CPU is reset. In other words, the fail-safe operations do not start immediately after the occurrence of the error.

SUMMARY OF THE INVENTION

The present invention therefore has an objective to provide an electronic control device having a control CPU and a monitoring CPU wherein the control CPU is promptly reset upon an occurrence of error for the control device.

In the electronic control device of the present invention, the control CPU performs a plurality of controls. The monitoring CPU is connected with the control CPU in an intercommunicative manner and performs a monitoring operation for the control CPU. The monitoring CPU determines whether the data from the control CPU is properly received. When the data is not properly received, it resets the control CPU.

With this configuration, the control CPU is reset immediately when the improper deter reception is detected. Therefore, a proper procedure, such as a fail-safe operation, can be taken immediately when a failure occurs.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to various embodiments in the accompanying drawings.

First Embodiment

Figure 1:
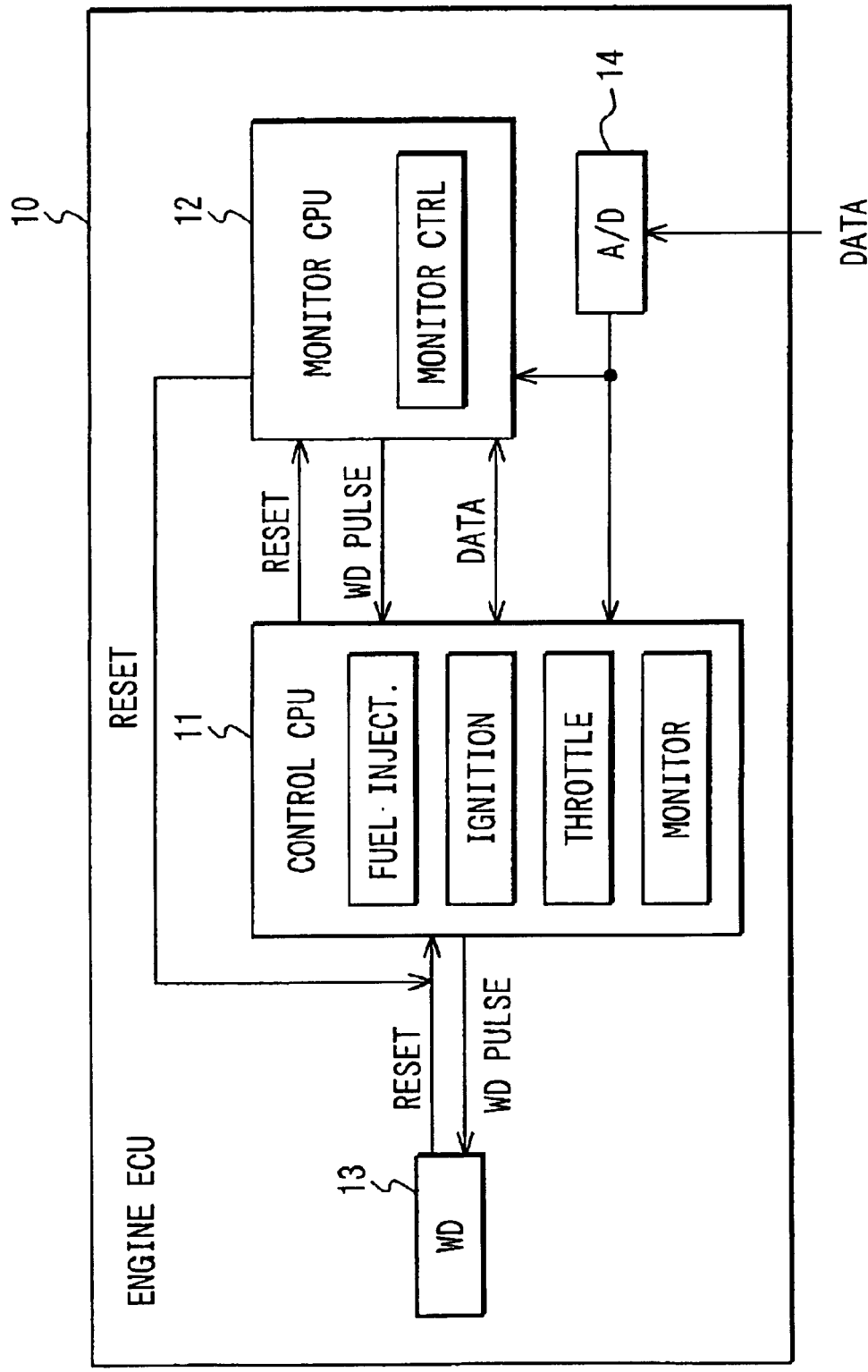
FIG. 1 is a block diagram showing a configuration of engine ECU 10 according to embodiments of the present invention.

Referring to FIG. 1, the engine ECU 10 includes a control CPU 11, a monitoring CPU 12, a watchdog (WD) circuit 13, and an analog to digital (A/D) converter 14. The control CPU 11 is provided for fuel injection control, ignition control and electronic throttle control. The monitoring CPU 12 is provided for monitoring the electronic throttle control. The WD circuit 13 is provided for monitoring operation of the control CPU 11. The control CPU 11 and the monitoring CPU 12 are connected in an intercommunicative manner.

The control CPU 11 receives data on a throttle operation angle and an accelerator operation angle via the A/D converter 14. It also continuously receives other engine operation information including the number of engine rotations and the air pressure in an intake duct. It controls driving fuel injection valves, an igniter, and a throttle actuator (not shown) based on the engine operation information. The data on the throttle operation angle and the accelerator operation angle are inputted to the monitoring CPU 12.

The control CPU 11 performs control for monitoring operation of the monitoring CPU 12. The monitoring CPU 12 outputs a WD pulse to the control CPU 11. When the WD pulse is not inverted for more than the predetermined period, the CPU 11 outputs a reset signal to the monitoring CPU 12. When the control CPU 11 does not properly receive the data from the monitoring CPU 12, it outputs a reset signal to the monitoring CPU 12.

The control CPU 11 transmits data on the throttle control, including the throttle operation angle, the accelerator operation angle, and the fail-safe implementation flags, to the monitoring CPU 12. When the monitoring CPU 12 has received the data, it performs a monitoring operation for the throttle control. The monitoring CPU 12 compares the data inputted from the control CPU 11 with data inputted from the A/D converter 14 to detect errors in the throttle control. The monitoring CPU 12 transmits the result of the comparison back to the control CPU 11.

The control CPU 11 performs predetermined fail-safe operations based on the result when an error occurs during the throttle control. The fail-safe operations include cylinder reduction control and ignition retard control. The cylinder reduction control is to stop a fuel injection in some cylinders, and ignition retard control is to retard ignition timing for operating the vehicle in a limp home mode.

The control CPU 11 outputs the WD pulse that is inverted in the predetermined cycle to the WD circuit 13. The WD circuit 13 outputs a reset signal to the control CPU 11 when the WD pulse is not inverted for more than the predetermined period.

In this embodiment, the monitoring CPU 12 resets the control CPU 11 directly. The monitoring CPU 12 outputs the reset signal to the control CPU 11 when the data transmission with the control CPU 11 is not properly performed. The reset signal from the monitoring CPU 12 is applied to a reset terminal that is provided to receive a reset signal from the WD circuit 13. With this configuration, when the reset signal is inputted to the control CPU 11, the control CPU 11 is reset by the reset signal and the monitoring CPU 12 is reset by the control CPU 11. Therefore, the control CPU 11 and the monitoring CPU 12 can be reset at the same time.

Figure 2:
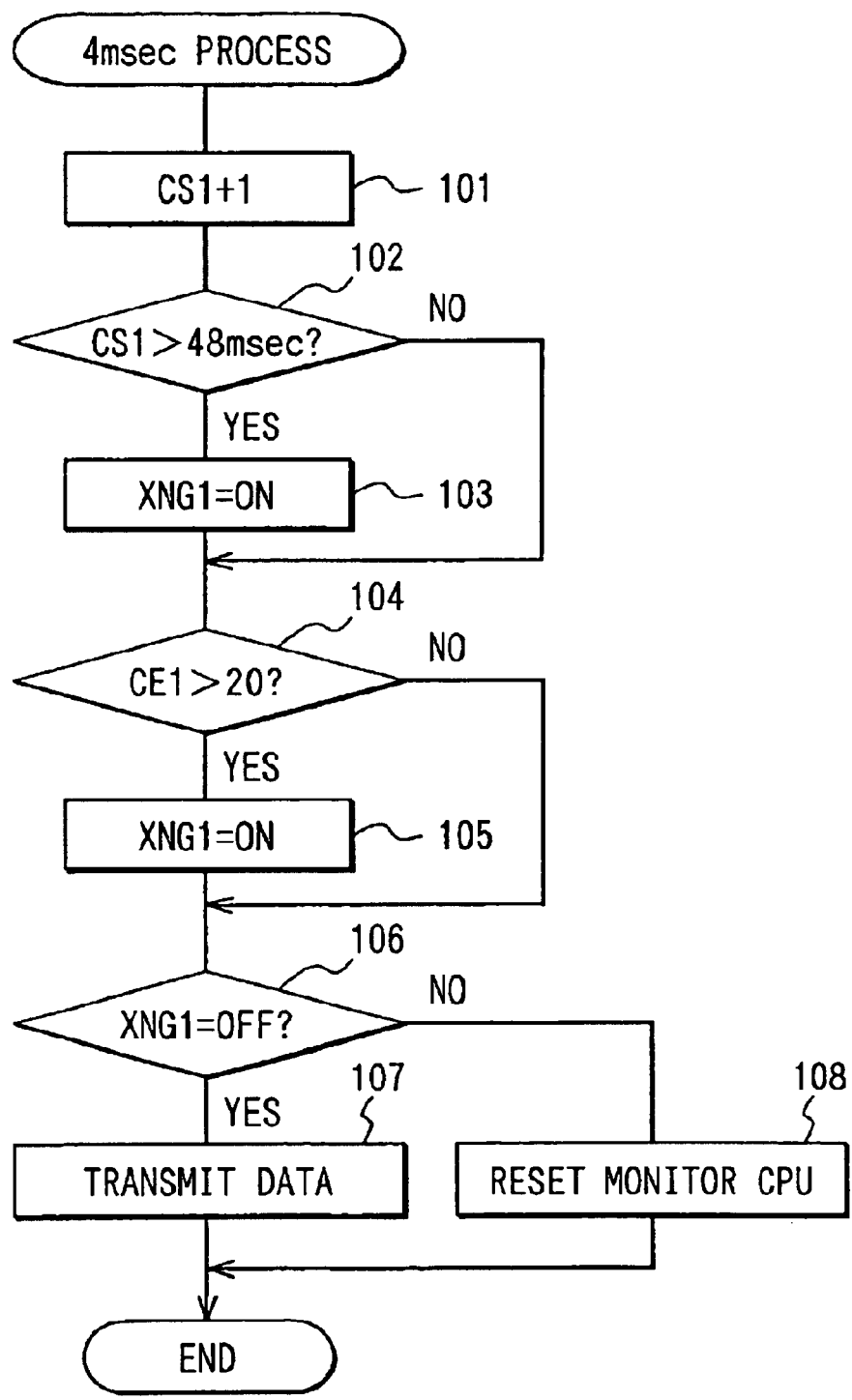
FIG. 2 is a flowchart showing a 4 msec process performed by a control CPU 11 according to the first embodiment of the present invention.

The control CPU 11 periodically transmits data to the monitoring PCU 12. The monitoring CPU 12 transmits data to the control CPU 11 via a receiving interrupt when it has received the data from the control CPU 11. The control CPU 11 performs a 4 msec process as shown in FIG. 2. A data transmission halt period counter CS1 is incremented by 1 in step 101. It is determined whether a value of the counter CS1 is larger than a predetermined value (corresponding to 48 msec in this embodiment) in step 102. If the value is larger than the predetermined value, it is determined that the monitoring CPU 12 has a data transmission error. Then, a data transmission error flag XNG1 is set to ON in step 103. In step 104, it is determined whether a value of a received data error counter CE1 is larger than a predetermined value (20 in this embodiment). If the value is larger than the predetermined value, it is determined that the monitoring CPU 12 has a data transmission error. Then, the error flag XNG1 is set to ON in step 105.

In step 106, it is determined whether the error flag XNG1 is OFF. If the error flag XNG1 is OFF, it is determined that the monitoring CPU 12 has no data transmission error. Then, the data is transmitted to the monitoring CPU 12 in step 107. If the error flag XNG1 is ON, it is determined that the monitoring CPU 12 has a data transmission error. Then, a reset signal is inputted to the monitoring CPU 12 in step 108.

Figure 3:
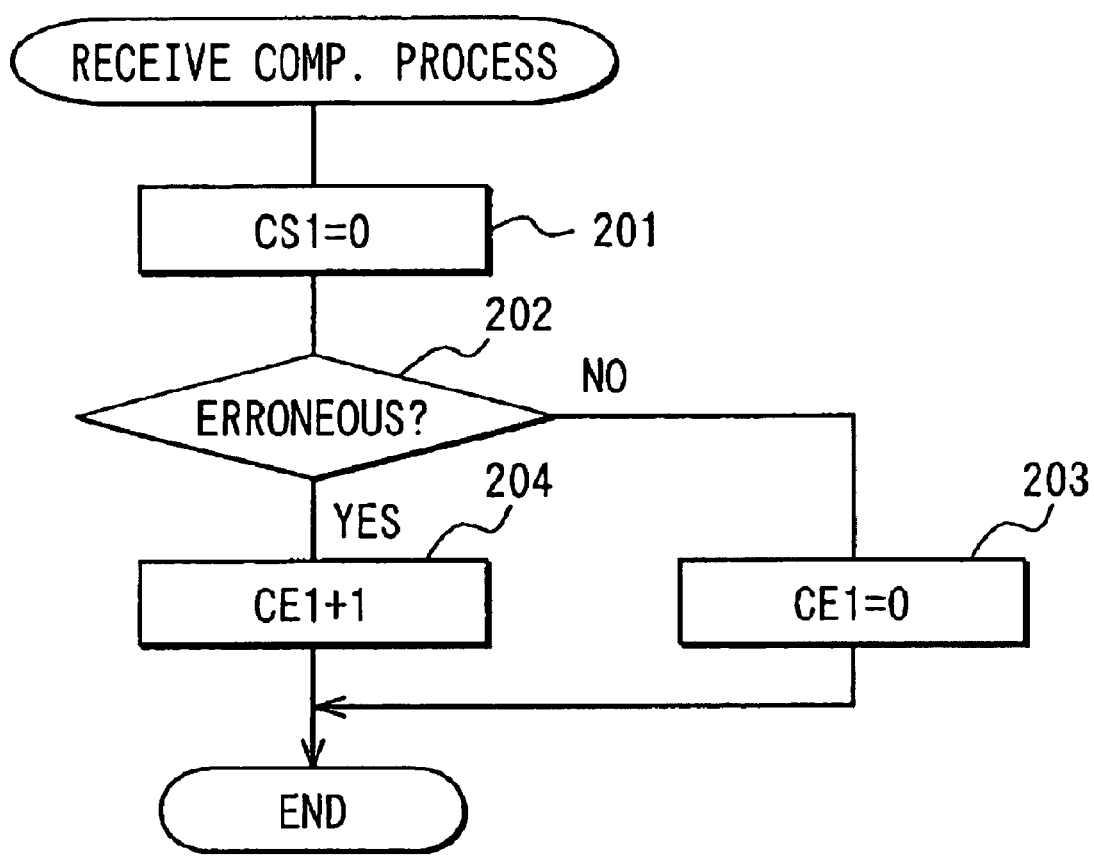
FIG. 3 is a flowchart showing a data receiving completion process performed by the control CPU 11 according to the first embodiment.

The control CPU 11 performs a receiving completion process as shown in FIG. 3. The counter CS1 is cleared to 0 in step 201. In step 202, it is determined whether the received data is erroneous. The error detection of the received data is performed utilizing a known sum check or a parity check. If the received data is not erroneous, the error counter CE1 is cleared to 0 in step 203. If the received data is erroneous, the error counter CE1 is incremented by 1 in step 204.

Figure 4:
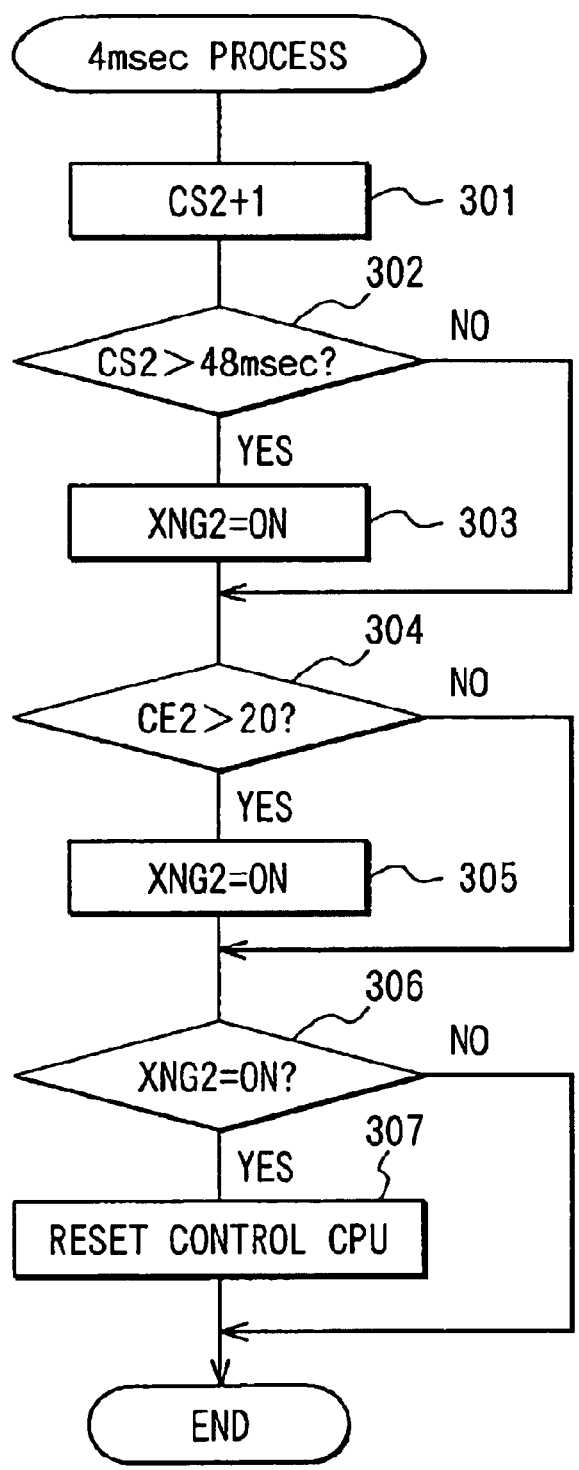
FIG. 4 is a flowchart showing a 4 msec process performed by a monitoring CPU 12 according to the first embodiment.

The monitoring CPU 12 performs a 4 msec process as shown in FIG. 4. A data transmission halt period counter CS2 is incremented by 1 in step 301. In step 302, it is determined whether a value of the counter CS2 is larger than a predetermined value (corresponding to 48 msec in this embodiment). If the value is larger than the predetermined value, it is determined that the control CPU 11 has a data transmission error. Then, a data transmission error flag XNG2 is set to ON in step 303.

In step 304, it is determined whether a value of a receiving data error counter CE2 is larger than a predetermined value (corresponding to 20 in this embodiment). If the value is larger than the predetermined value, it is determined that the control CPU 11 has a data transmission error. Then, the error flag XNG2 is set to ON in step 305. In step 306, it is determined whether the error flag XNG2 is ON. If the error flag XNG2 is ON, a reset signal is inputted to the control CPU 11 in step 307.

Figure 5:
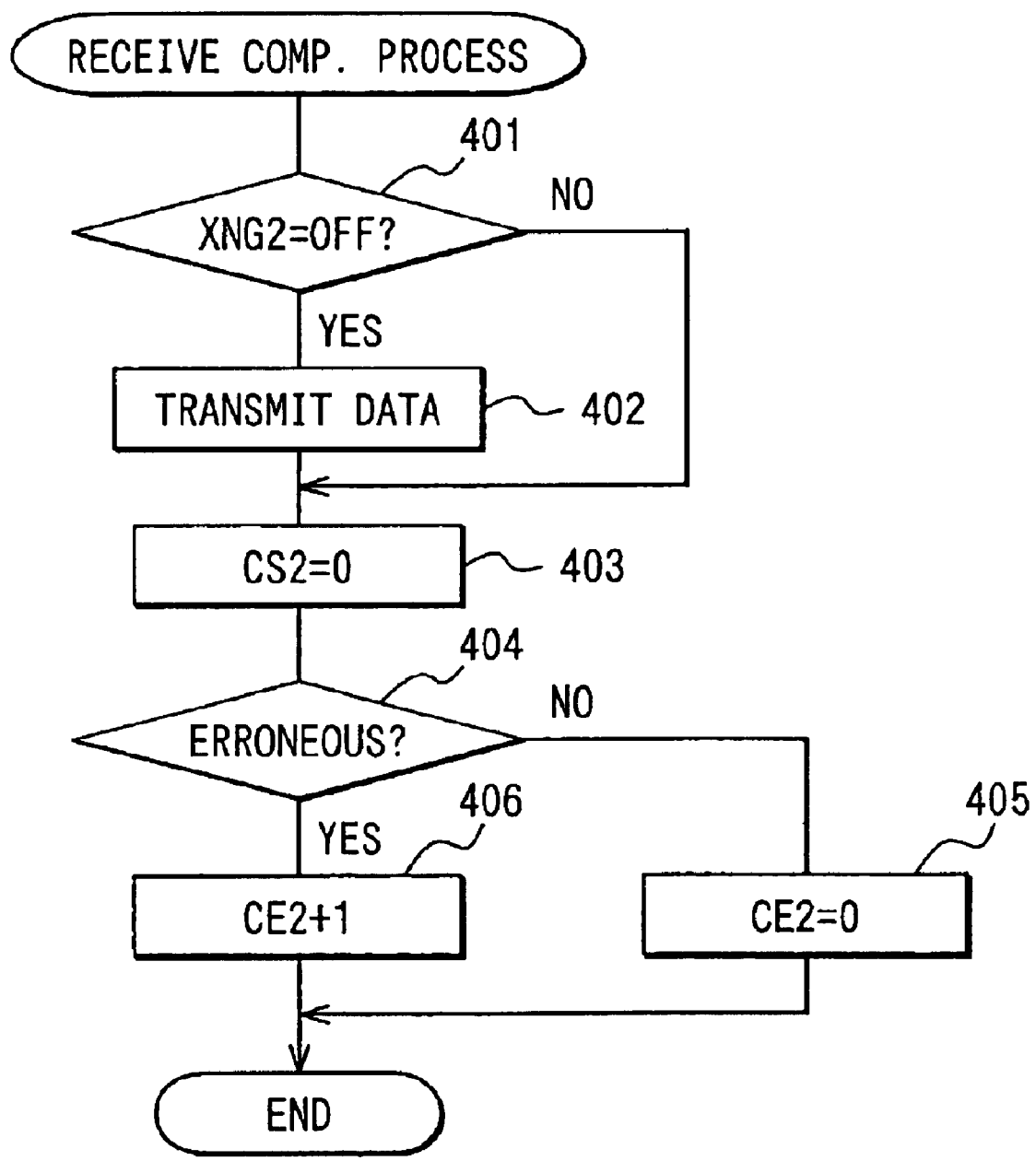
FIG. 5 is a flowchart showing a data receiving completion process performed by the monitoring CPU 12 according to the first embodiment.

The monitoring CPU 12 performs a signal receiving completion process as shown in FIG. 5. It is determined whether the error flag XNG2 is OFF in step 401. If the error flag XNG2 is OFF, data is transmitted in step 402. In step 403, the counter CS2 is cleared to 0. In step 404, it is determined whether the received data is erroneous. If the received data is not erroneous, the counter CE2 is cleared to 0 in step 405. If the received data is erroneous, the counter CE2 is incremented by 1 in step 406.

Figure 6A:
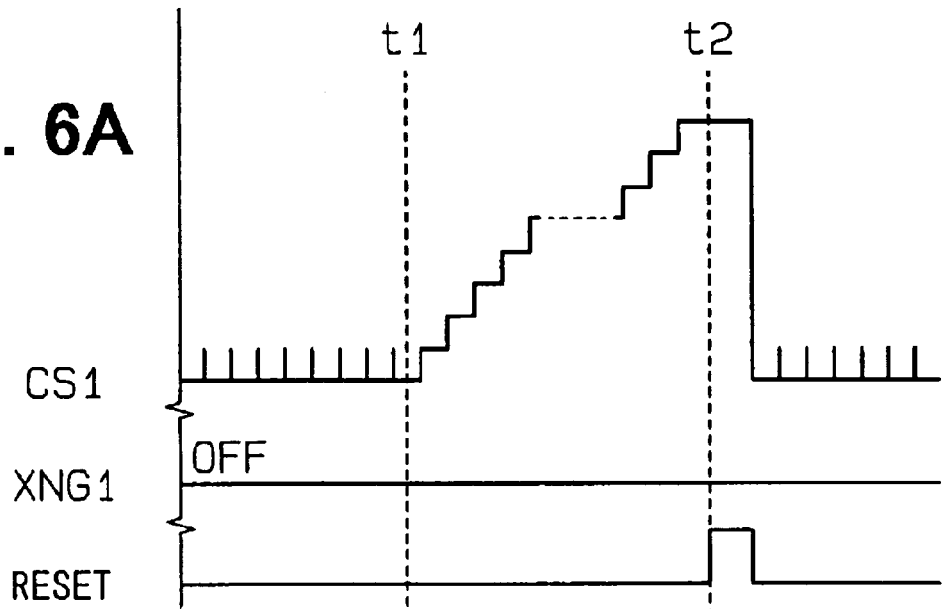
FIG. 6 is a timing diagram showing a data transmitting operation in detail according to the first embodiment.
Figure 6B:
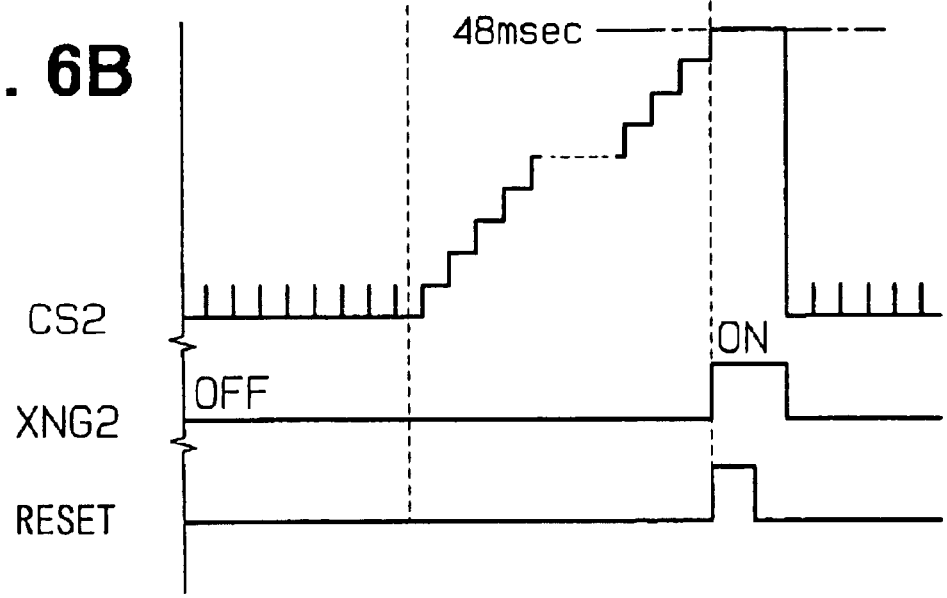

When the data transmission from the control CPU 11 to the monitoring CPU 12 is stopped, the control CPU 11 and the monitoring CPU 12 operate as shown in FIGS. 6A and 6B. Before time t1, the counters CS1 and CS2 are incremented by 1 whenever the data transmission is performed between the control CPU 11 and the monitoring CPU 12. In the signal receiving completion processes, the counters CS1 and CS2 are cleared to 0. During this period, the error flags XNG1 and XNG2 remain OFF.

When the data transmission is stopped at time t1, the counter CS2 is not cleared because the data receiving completion process is not performed by the monitoring CPU 12. The data transmission from the monitoring CPU 12 stops at this time, and the counter CS1 is not cleared. Because counting timing of the counter CS2 is earlier than that of the counter CS1, the counter CS2 reaches time t2 first and the error flag XNG2 is set to ON. As a result, the control CPU 11 is reset by the monitoring CPU 12. With this operation, the monitoring CPU 12 is reset by the control CPU 11 as well. When the control CPU 11 and the monitoring CPU 12 are restarted after the reset, the counters and flags are initialized.

Figure 7A:
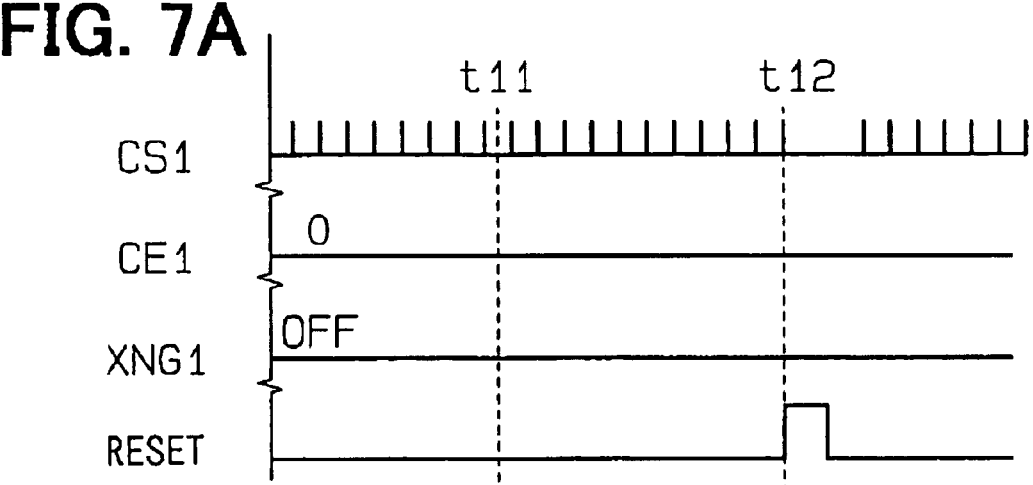
FIG. 7 is a timing diagram showing a data transmitting operation in detail according to the first embodiment.
Figure 7B:
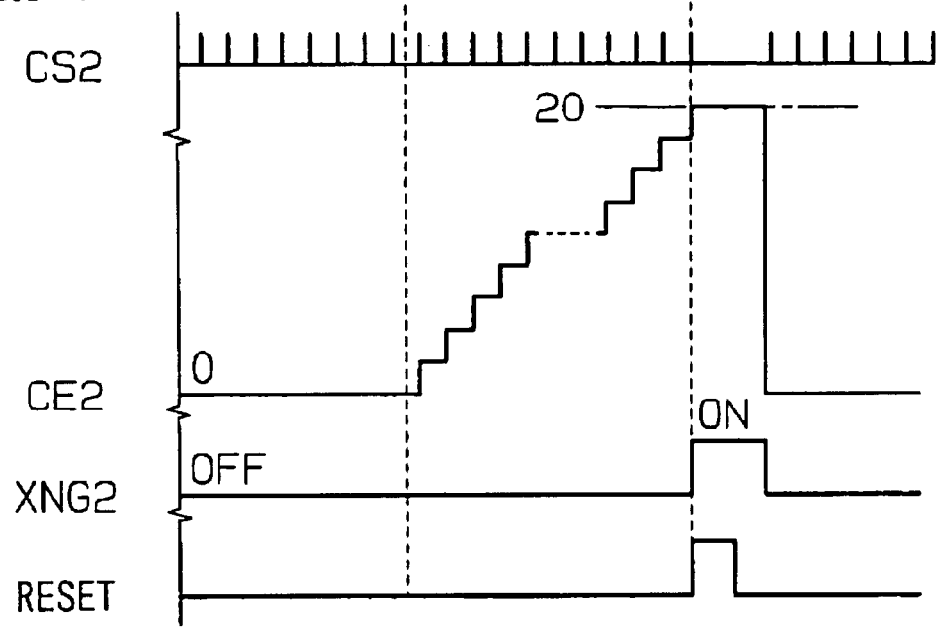

In FIG. 7, when the data reception from the control CPU 11 is determined as erroneous, the counter CE2 is incremented by 1. When the counter CE2 reaches 20, the control CPU 11 is reset by the monitoring CPU 12. With this operation, the monitoring CPU 12 is reset by the control CPU 11.

When an error occurs during the data transmission from the monitoring CPU 12 to the control CPU 11, the counter CS1 is incremented. Then, the flag XNG1 is set to ON when the count of the counter CS1 reaches a value corresponding to 48 msec. As a result, the monitoring CPU 12 is reset by the control CPU 11.

According to the embodiment discussed above, when the data from the control CPU 11 is not properly received, the monitoring CPU 12 resets the control CPU 11. Therefore, the control CPU 11 is immediately reset when an error occurs. In other words, when the throttle control by the control CPU 11 seems unstable, an action to the error, such as a fail-safe operation, is immediately performed.

Second Embodiment

A Clocked Serial Interface (CSI) system is used for the data transmission between the control CPU 11 and the monitoring CPU 12. With the CSI, the data transmission is performed in synchronized relation with a clock. Data transmission and reception are not separated from each other in the CSI system. When the monitoring CPU 12 has received a clock signal and data from the control CPU 11, it transmits data back to the control CPU 11 via hardware. The monitoring CPU 12 does not have a data receiving interrupt function. Therefore, it is difficult to detect errors in the control CPU 11 based on a determination whether the data transmission is performed.

In this embodiment, data is transmitted with monitoring data that is updated every time the data is transmitted. Then, the monitoring CPU 12 detects data transmission errors based on the determination whether the monitoring data is updated.

Figure 8:
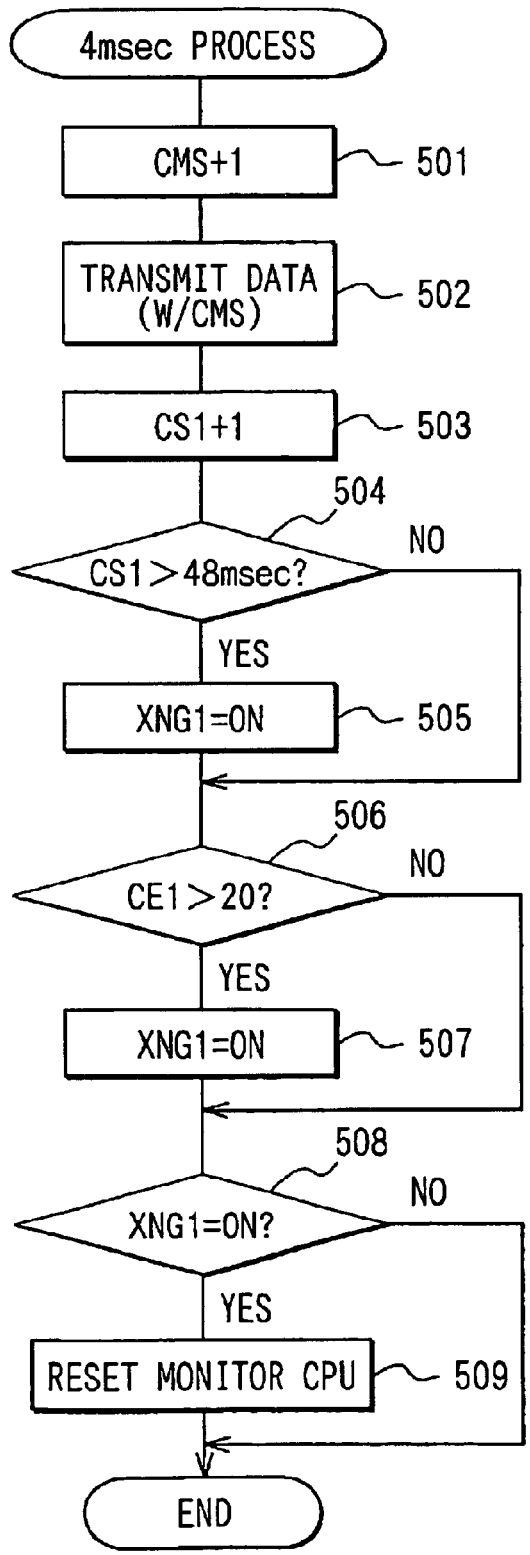
FIG. 8 is a flowchart showing a 4 msec process performed by the control CPU 11 according to the second embodiment.

The control CPU 11 performs the 4 msec process shown in FIG. 8. In step 501, the data transmission counter CMS is incremented by 1. The counter CMS is used to provide data transmission monitoring data. In step 502, data is transmitted to the monitoring CPU 12 with the data provided by the data transmission counter CMS. In step 503, the counter CS1 is incremented by 1. In step 504, it is determined whether a count of the counter CS1 is larger than a value corresponding to a predetermined period (48 msec in this embodiment). If the count is larger than the predetermined value, it is determined that the monitoring CPU 12 has a data transmission error. Then, the error flag XNG1 is set to ON in step 505.

In step 506, it is determined whether a count of the counter CE1 is larger than a predetermined value (20 in this embodiment). If the count is larger than the predetermined value, it is determined that the monitoring CPU 12 has a data transmission error. Then, the error flag XNG1 is set to ON in step 507. In step 508, it is determined whether the error flag XNG1 is ON. If the error flag XNG1 is ON, a reset signal is inputted to the monitoring CPU 12 in step 509.

Figure 9:
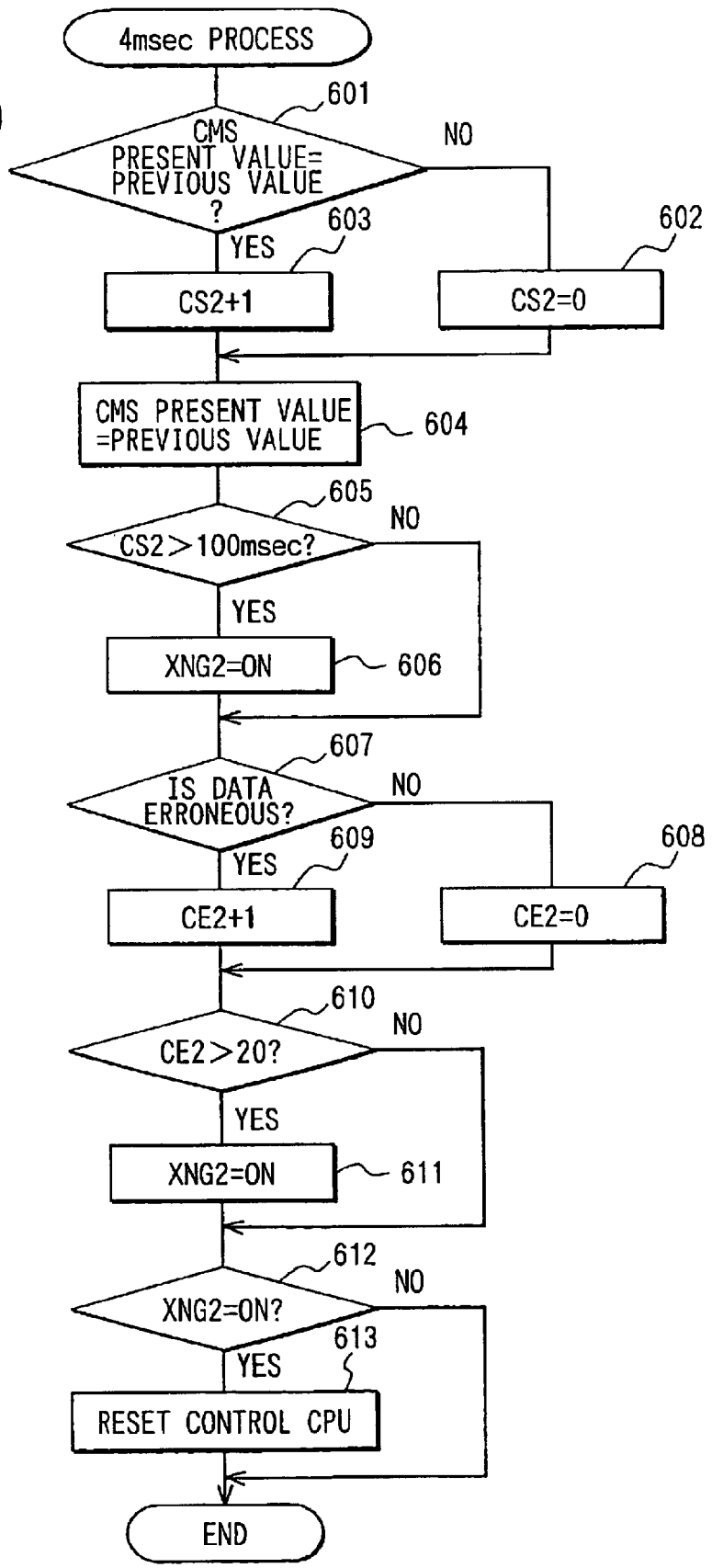
FIG. 9 is a flowchart showing a 4 msec process performed by the monitoring CPU 12 according to the second embodiment.

The monitoring CPU 12 performs the 4 msec process shown in FIG. 9. In step 601, it is determined whether a present value matches with a previous value of the data transmission counter CMS. If it does not match, the counter CS2 is cleared in step 602. If the present value matches with the previous value, the counter CS2 is incremented by 1 in step 603. In step 604, the status of the present value of the data transmission counter CMS is changed to a previous value.

In step 605, it is determined whether a count of the counter CS2 is larger than a value corresponding to a predetermined period (100 msec in this embodiment). If the count is larger than the predetermined value, it is determined that the control CPU 11 has a data transmission error. Then, the error flag XNG2 is set to ON in step 606.

In step 607, it is determined whether the received data is erroneous via a sum check or a parity check. If the received data is not erroneous, the counter CE2 is cleared to 0 in step 608. If the received data is erroneous, the counter CE2 is incremented by 1 in step 609. In step 610, it is determined that a count of the counter CE2 is larger than a predetermined value (20 in this embodiment). If the count is larger than the predetermined value, it is determined that the control CPU 11 has a data transmission error. Then, the error flag XNG2 is set to ON in step 611.

In step 612, it is determined whether the error flag XNG2 is ON. If the error flag XNG2 is ON, a reset signal is inputted to the control CPU 11 in step 613.

Figure 10A:
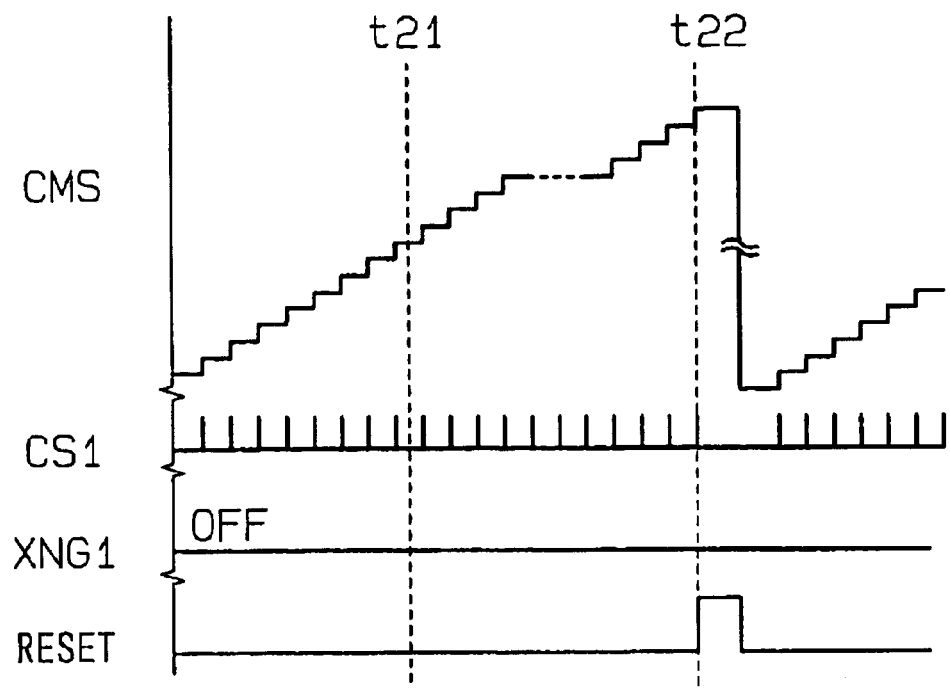
FIG. 10 is a timing diagram showing a data transmitting operation in detail according to the second embodiment.
Figure 10B:
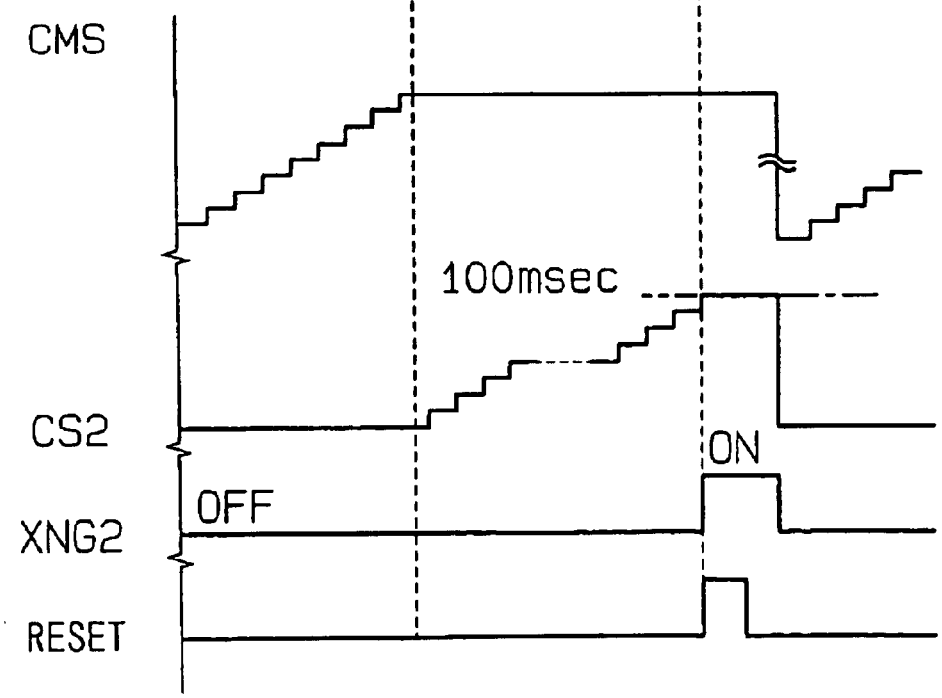

When the data transmission from the control CPU 11 to the monitoring CPU 12 is stopped, the control CPU 11 and the monitoring CPU 12 operate as shown in FIGS. 10A and 10B. In the control CPU 11, the counter CMS is incremented in a 4 msec cycle. Before time t21, the monitoring CPU 12 properly receives data on the CMS operation in the control CPU 11. Therefore, the counter CS2 is not incremented. During this period, the error flags XNG1 and XNG2 remain OFF.

When the data transmission from the control CPU 11 to the monitoring CPU 12 is stopped at time t21, the counter CMS is not incremented after that. The counter CS2 is incremented instead. When a value in the counter CS2 reaches a value corresponding to 100 msec (time t22), the error flag XNG2 is set to ON, and the control CPU 11 is reset by the monitoring CPU 12. When the control CPU 11 is reset, the monitoring CPU 12 is also reset by the control CPU 11. When the control CPU 11 and the monitoring CPU 12 are restarted after the reset, the counters and flags are initialized.

According to the second embodiment, the control CPU 11 can be immediately reset when an error occurs. Especially, errors in the control CPU 11 can be easily detected although the monitoring CPU 12 does not have a signal receiving interrupt function.

The present invention should not be limited to the embodiment previously discussed and shown in the figures, but may be implemented in various ways without departing from the spirit of the invention.

For example, flag information can be used as data transmission monitoring data. In the case of utilizing the data transmission counter CMS, a cycle to update the counter value can be modified as long as the monitoring data is changeable for every data transmission.

The control CPU 11 and the monitoring CPU 12 can have stand-by RAMs used as backup memory for each to store states of the error flags XNG1 and XNG2. A data transmission error is determined when the data transmission error is detected a predetermined number of times. Then, the error occurrence is reported to a user via some kind of method including a warning lamp. With this configuration, false detection of the data transmission error can be reduced.

What is claimed is:

1. An electronic control device comprising:

a control CPU; and a monitoring CPU for monitoring control operations of the control CPU, wherein the monitoring CPU is connected with the control CPU in an intercommunicative manner to receive data on the control operations of the control CPU;

wherein a first reset signal is outputted from the monitoring CPU to the control CPU, and wherein a second reset signal is outputted from the control CPU to the monitoring CPU.

2. The electronic control device as in claim 1, further comprising a monitoring circuit for monitoring operations of the control CPU, wherein the monitoring circuit receives a watchdog pulse that is outputted from the control CPU and inverted in a predetermined cycle, and outputs a third reset signal to the control CPU when periodicity of the cycle is disrupted.

3. The electronic control device as in claim 2, wherein:

the control CPU has a reset terminal for receiving the reset signal from the monitoring circuit; and the reset signal outputted from the monitoring CPU is also applied to the reset terminal.

4. The electronic control device as in claim 1, wherein the control CPU has an engine control function and an electronic throttle control function for a vehicle.

5. The electronic control device as in claim 4, wherein the monitoring CPU receives data at least on the electronic throttle control for monitoring electronic throttle control operations.

6. A control CPU monitoring method for an electronic control device having a control CPU and a monitoring CPU that is connected with the control CPU in an intercommunicative manner, the method comprising steps of:
   transmitting control operation data from the control CPU to the monitoring CPU in a predetermined cycle:
   determining a data receiving condition of the monitoring CPU; and
   resetting the control CPU by the monitoring CPU when the data receiving condition is determined faulty,
   wherein the determining step determines that data receiving condition is faulty when a length of period for which the monitoring CPU fails to receive the data is longer than a predetermined length.

7. The control CPU monitoring method as in claim 6, further comprising steps of:
   inputting a watchdog pulse with a predetermined cycle from the control CPU to a monitoring circuit; and
   outputting a first reset signal from the monitoring circuit to a reset terminal of the control CPU when periodicity of the watchdog pulse is disrupted,
   wherein the resetting step resets the control CPU by a second reset signal outputted from the monitoring CPU and inputted to the control CPU via the reset terminal.

8. The control CPU monitoring method as in claim 6, wherein the control operation data includes data on a vehicle operation control.

9. The control CPU monitoring method as in claim 8, wherein the vehicle operation control data includes data on an electronic throttle control.

10. The control CPU monitoring method as in claim 8, wherein the vehicle operation control data further includes data on an engine control.

11. A control CPU monitoring method for an electronic control device having a control CPU and a monitoring CPU that is connected with the control CPU in an intercommunicative manner, the method comprising steps of:
   transmitting control operation data from the control CPU to the monitoring CPU in a predetermined cycle;
   determining a data receiving condition of the monitoring CPU; and
   resetting the control CPU by the monitoring CPU when the data receiving condition is determined faulty,
   wherein the transmitting step transmits monitoring data that is updated every data transmission, in addition to the control operation data, from the control CPU to the monitoring CPU; and
   the determining step determines the data receiving condition based on whether the monitoring data is updated.

12. The control CPU monitoring method as in claim 11, wherein the monitoring data includes a number of times that the data is updated upon the data transmission.

13. The control CPU monitoring method as in claim 11, further comprising a step of:
   transmitting response data in response to the monitoring data from the monitoring CPU to the control CPU in synchronization with the data transmission from the control CPU to the monitoring CPU.

14. The control CPU monitoring method as in claim 13, further comprising steps of:
   determining whether the control CPU has successfully received the response data; and
   outputting a third reset signal from the control CPU to the monitoring CPU when it is determined that the control CPU has failed to receive the response data.

15. The control CPU monitoring method as in claim 11, further comprising steps of:
   inputting a watchdog pulse with a predetermined cycle from the control CPU to a monitoring circuit; and
   outputting a first reset signal from the monitoring circuit to a reset terminal of the control CPU when periodicity of the watchdog pulse is disrupted,
   wherein the resetting step resets the control CPU by a second reset signal outputted from the monitoring CPU and inputted to the control CPU via the reset terminal.

16. The control CPU monitoring method as in claim 11, wherein the control operation data includes data on a vehicle operation control.

17. The control CPU monitoring method as in claim 16, wherein the vehicle operation control data includes data on an electronic throttle control.

18. The control CPU monitoring method as in claim 16, wherein the vehicle operation control data further includes data on an engine control.

* * * * *